Figure 1:
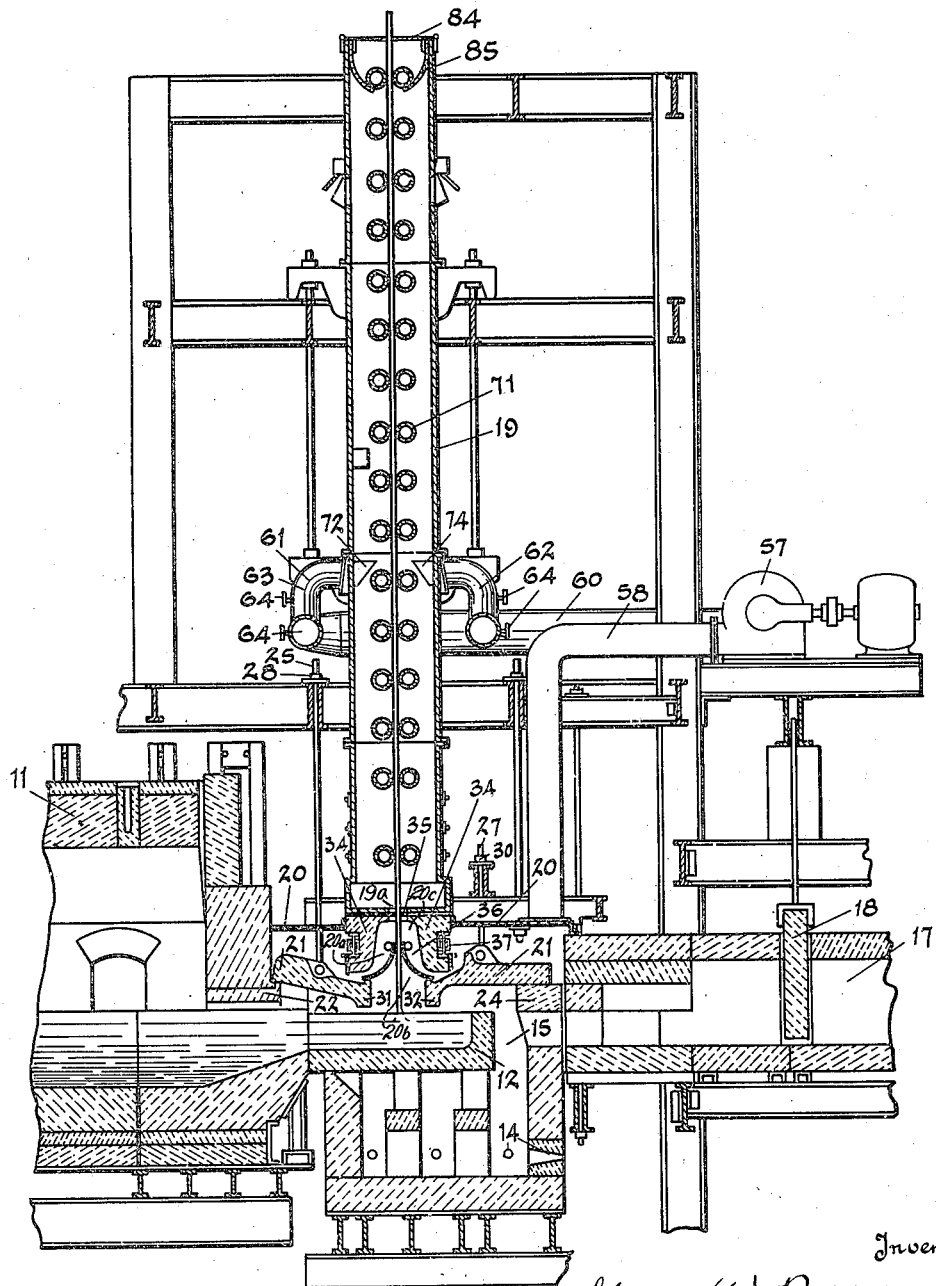

July 12, 1949. G. W. BATCHELL 2,475,773
SHEET GLASS FORMING APPARATUS AND METHOD
Filed Aug. 28, 1942 3 Sheets-Sheet 1

Inventor
George W. Batchell
By [signature]
Attorney

July 12, 1949.   G. W. BATCHELL   2,475,773
SHEET GLASS FORMING APPARATUS AND METHOD
Filed Aug. 28, 1942   3 Sheets-Sheet 3

Inventor
George W. Batchell
By
Attorney.

Patented July 12, 1949

2,475,773

UNITED STATES PATENT OFFICE 2,475,773

SHEET GLASS FORMING APPARATUS AND METHOD

George W. Batchell, Toledo, Ohio, assignor to Toledo Engineering Company, Inc., Toledo, Ohio, a corporation of Ohio Application August 28, 1942, Serial No. 456,478

10 Claims. (Cl. 49—17)

My invention has for its object to provide a means and method for regulatively controlling the temperature of sheet glass as it is drawn through a leer from the forebay of a glass furnace by utilizing a gaseous composition in the glass passageway through the leer including hot gases ambient to or gathered in a forebay.

The invention provides a means and method for producing a uniform controlled cooling of the sheet glass after it leaves the forebay to maintain uniform change in the consistency, particularly of the surface glass of the sheet, and thus eliminate wave lines from the glass, which ordinarily appear in the finally formed sheet glass.

Particularly, the invention has for its object to provide pneumatic conduit means, independent of the leer passageway, joining the space immediately adjacent the forebay with the formed glass passageway in the leer, at a point spaced from the formed glass inlet thereof, and forming, with that part of the leer passageway between said inlet and point and with said forebay adjacent space, a pneumatic circuit, through which hot gases ambient within said forebay adjacent space may be circulated to temper the formed glass moving through said part of the leer passageway. Further, the invention has for a particular object to provide means for producing spaced zones of pneumatic pressure differentials in said circuit in such relation to said leer passageway part and adjacent forebay space as to withdraw hot gases ambient to said adjacent forebay space and cause pressure equalizing pneumatic flow thereof to said leer passageway part and through the same in an opposite direction to that in which the formed glass is moved through said leer passageway part.

The invention may be contained in structures of different forms, and, to illustrate a practical application of the invention, I have selected a sheet-glass forming apparatus and method as examples of the various structures and steps embodying the invention and shall describe the selected apparatus and method hereinafter, it being understood that certain features of my invention may be used to advantage without a corresponding use of other features of the invention and without departing from the spirit of the invention, as presented in the claims. The particular structure selected is shown in the accompanying drawings.

This application is a continuation-in-part of application Ser. No. 279,714, filed June 17, 1939 and subsequently issued as United States Patent No. 2,297,737.

Figure 2:
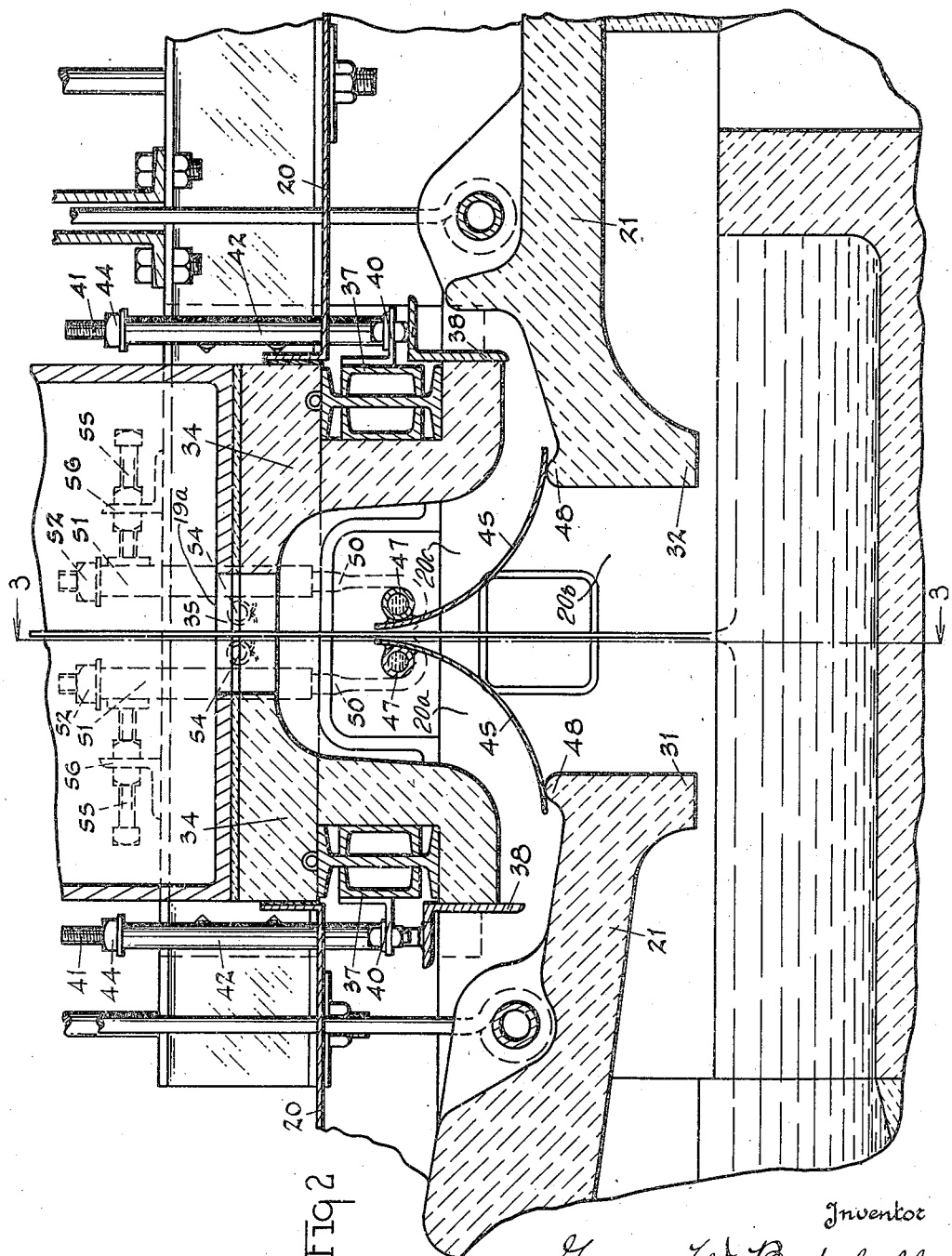
Figure 3:
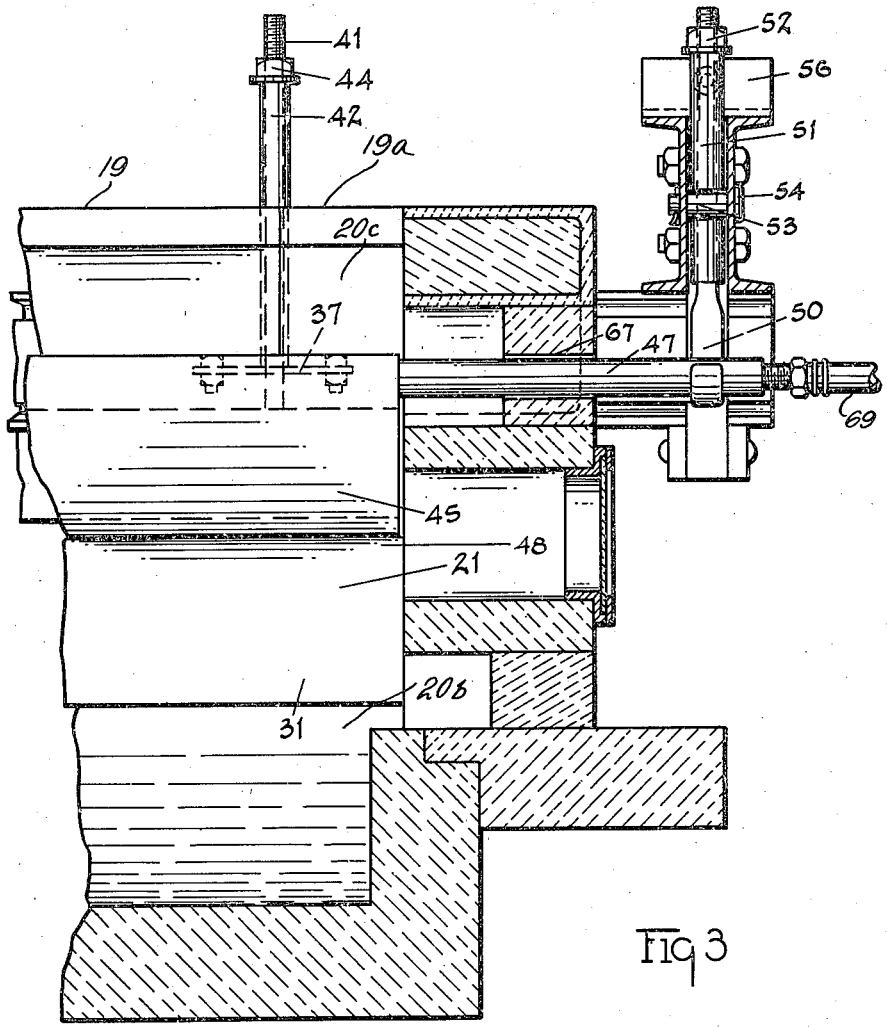
Figure 4:
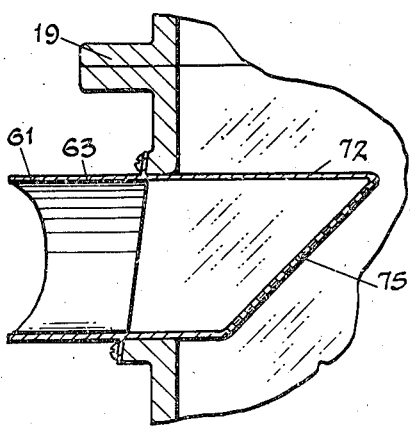

Fig. 1 of the drawings illustrates a view of a section of the forebay of a glass furnace, from which the glass is drawn in sheet form, and a tower leer for annealing the sheet glass as it is drawn from the glass of the furnace. Fig. 2 is an enlarged longitudinal section of the forebay of the furnace, and heat reflectors from between which the glass and heated air are drawn. Fig. 3 is an enlarged transverse section of a wall part of the forebay taken on the plane of the line 3—3 indicated in Fig. 2. Fig. 4 illustrates a view of a section of one side part of a manifold heated-air inlet also shown in Fig. 1 taken on a plane of the line of air movement.

The glass furnace 11 may be of any well known type of furnace for melting glass and directing the refined glass to the forebay 12. The forebay and the furnace may be heated by suitable burners. In the apparatus shown in the drawings, the forebay is heated by the burners 14, located below the bottom of the forebay 12. Portions of the products of combustion of the burners 14 are withdrawn through flue 17, as may be controlled by a gate 18. Also a leer 19 communicates with the forebay through a formed glass leer inlet 19a to enable the sheet glass to be drawn from the forebay into one end of the leer.

The forebay is completely covered by a cover 20 to form, with the forebay and the lower or inlet end of the leer 19, a chamber 20a in which gases are gathered and confined for use as hereinafter described. These gases include certain portions of the products of combustion of burners 14, not withdrawn through the flue 17 and entering the chamber 20a by way of flue 15; the gases from within the furnace 11 and the gases ambient to the molten glass within the forebay 12. The cover 20 may be formed, as by steel plate sections mounted on the steel frame and refractory blocks of the furnace and the forebay substantially as shown in the drawings.

In order to shield the pool of molten glass in the forebay, a pair of adjustable refractory blocks 21 may be tiltably supported on shoulders 22 and 24 formed of wall parts of the furnace and sustained by rods 25 and 27 in overhanging relation, with respect to the glass of the forebay. The rods 25 and 27 are pivotally connected to suitable lugs that are formed in the refractory blocks 21 and are provided with threaded end parts, on which are located suitable nuts 28 and 30 for adjusting the location of the downwardly extending end flanges 31 and 32 of blocks 21 with reference to the surface of the glass in the forebay.

A pair of reflector plates 45 are connected to a pair of pipes or hollow rods 47 that extend through opening 67 in the end walls of the forebay of the furnace. The rods 47 are rotatably supported and connected to the upper edge portions of the reflector plates 45. The lower edge portions of the reflector plates 45 rest upon rounded edge or beaded portions 48 formed on the inner and upper end edges of the blocks 21. Consequently, as the blocks 21 are adjusted with reference to the surface of the glass, the reflector plates 45 are tilted by angular movements of the rods 47. The ends of the rods 47 are supported on hooked ends of the rods 50 that extend through sleeves 51, and are provided with threaded end portions, on which are located suitable nuts 52 to adjust the rods with respect to the sleeves 51. The sleeves 51 are welded to bushings 53, through which pins 54 extend, the pins being secured to a part of the frame of the forebay for pivotally supporting the rods 50. The angular position of the rods 50, with respect to the forebay, is adjusted by means of the screws 55 that are connected to the sleeves 51. The screws 55 extend through brackets 56 located on one of the beams of the frame of the furnace, and, when rotated, the screws laterally adjust the rods 47. Thus, the tubular rods 47 may be adjusted, both vertically and horizontally, to adjust the reflector plates 45 with respect to the sheet glass as it is initially drawn from the furnace. The upper edge portions of the reflector plates 45 may be raised with respect to the sheet glass as it is being drawn from the glass of the forebay or may be, if desired, moved toward or away from the surface of the sheet glass. As the rods 47 are adjusted, the lower edge portions of the reflector plates 45 are tilted and slid on the rounded edge portions 48 of the blocks 21. If desired, the rods 47 may be connected with pipes 69 and cooling air or water directed therethrough. When the rods 47 are positioned to adjust the plates 45 in a desired relation, portions of the opening 67 may be closed by suitable refractory material.

The reflector plates 45 and blocks 21 not only shield the molten glass pool in the forebay but also divide the chamber 20a into two substantially separate compartments. The lower-most compartment 20b communicates directly with the furnace 11 and flue 15 and the other upper-most compartment 20c communicates directly with the leer 19 through the leer inlet 19a. Communication between the compartments 20b and 20c is had between the approximating edges of the plates 45 between which the drawn glass sheet moves. As stated the degree of communication may be varied by the rods 47. Within the compartment 20c and above the upper end edge portions of the blocks 21 and plates 45 are located a pair of channeled blocks 34 that are centrally spaced from each other along major portions of their inner edges to form a slot 35 in aligning registration with the leer inlet 19a and the space between the plates 45 through which the glass sheet is drawn. The space 36, between the blocks, forms an elongated dome or curved ceiling part in the compartment 20c. The sheet glass is drawn upwardly from the glass of the forebay, from between the flanges 31 and 32 of the blocks 21, through the dome formed by the space 36, and the slot 35.

The blocks 34 are provided, in their outer lateral surfaces, with channels, in which are located beams 37 which are connected to the frame of the furnace and its associated parts for supporting the blocks 34 in position above the forebay 12. A pair of plates 38 (Fig. 2) is so located as to slidably contact the outer lateral surfaces of the blocks 34 and also may be moved so that their lower edges contact the top surfaces of the blocks 21. The plates 38 are supported by means of suitable brackets 40 that are secured to the beams 37. Rods 41 are connected to the plates 38 and extend through sleeves 42 that may be supported on the brackets 40. The upper ends of the rods 41 are threaded, and suitable nuts 44 are located on the threaded parts of the rods 41 to vary the location of the lower edges of the plates 38 relative to the blocks 21 for purposes hereinafter described.

As the glass is drawn from the forebay 12, it passes through compartment 20b of chamber 20a between the edges of reflector plates 45, through compartment 20c of chamber 20a, the slot 35 and leer inlet 19a into the tower leer 19. The leer 19 is of sufficient height to enable, according to the drawing rate of the sheet glass, annealing of the glass to eliminate all internal stresses and strains, in advance of cutting the sheet glass into plates. The lower part of the leer may be heat-insulated by suitable heat-insulating material to reduce heat absorption by conduction. The upper end of the leer is formed of non-insulated sheet metal, and heat conduction through the wall of the leer is normal. The leer may be formed in sections and secured in position by a suitable frame. The leer 19 is provided with a plurality of pairs of spaced rollers 71 that have substantially the same surface engagement with the sheet glass. The rollers are interconnected by suitable driving means for causing rotation of all rollers at the same rate and to produce uniform rate of movement of all parts of the glass.

The temperature of the interior of the leer 19 is regulated by directing the gases gathered in the chamber 20a at a pressure and in a quantity to maintain a relatively slow directed circulation in the leer. The composition of the gases gathered in the chamber 20a, particularly in the compartment 20c thereof, may be effectively varied and determined by adjustment of the gate 18, the blocks 21 or the plates 45. An increased percentage of the combustion products from the burners 14 may be obtained by moving the gate 18 toward a closing position of the flue 17. The quantity of admixed furnace and forebay gases may be varied by adjusting the spacing between the upper edges of the plates 45 with reference to the glass sheet being drawn or the spaced relation of the flanges 31 and 32 of the blocks 21 relative to the molten glass surface within the forebay.

Gases from the forebay chamber 20a are drawn by a suction fan 57 of any well known construction and mode of operation from the forebay of the furnace through a heat insulated pipe 58 connected to the compartment 20c of chamber 20a and directed from the suction fan through the heat insulated pipe 60 to a manifold 61. The manifold 61 comprises a pair of pipes 62 and 63 terminating at points spaced from the leer inlet 19a on opposite sides of the path of movement of glass through the leer. The pipes 62 and 63 have suitable dampers 64, for varying the pneumatic flow therethrough. A pair of shells 72 and 74 are connected to the pipes 62 and 63. The shells are each substantially trapezoidal in cross-sectional form and have reticulated sides 75 inclined to the vertical for directing gases from the pipes 62 and 63 downwardly into the leer passageway on opposite sides of the sheet glass and produce distribution of the temperature controlling gases throughout the width of the leer.

The pneumatic flow from the compartment 20c and through the pipes 58, 60, 61, 62 and 63 may be further varied and adjusted by movement of the plates 38 relative to the blocks. Preferably, the setting of the gate 18, the blocks 21, plates 45 and 38, and the dampers 64 is such that the desired gaseous composition is obtained in the compartment 20c and that the suction pump produces spaced zones of pressure differential in the pneumatic circuit comprising pipes 58, 60, manifold 61, pipes 62 and 63, that part of the leer passageway between the points at which pipes 62 and 63 connect therewith and the inlet 19a, the inlet 19a, and compartment 20c of the forebay chamber 20a. The zones of pressure differential are produced in said pneumatic circuit so as to cause pneumatic flow from the high pressure zone to the lower pressure zone through the leer passageway part of the pressure zone through the leer passageway part of the pneumatic circuit in an opposite direction to that in which the formed glass sheet is moved by the rollers 71.

The forebay gases, introduced through shells 72 and 74, descend by reason of the suction of the suction fan 57 or blower and pass through inlet 19a, the slot 35 formed between the blocks 34, through the spaces between the blocks 34 and plates 45 and the sheet glass in compartment 20c and below the edges of the plates 38, through the pipe 58 to the blower and from the blower through the pipe 60 to the shells 72 and 74 and into the leer again. Supplementary quantities of gases required in the circuit are drawn into the compartment 20c from between the end flanges 31 and 32 and molten glass pool in the forebay 12 through the edges of the plates 45 and the sheet glass being drawn therebetween.

The upper end of the leer may be provided with a pair of gates 84 located on opposite sides of the sheet glass, that may be opened more or less when it is desired to manipulate the glass for any purpose when it passes the uppermost of the rollers 71. A pair of elastic flexible wipers 85 are located so as to contact the surface of the uppermost pair of rollers 71 for substantially closing the upper end part of the leer and, thus, prevent the escape of any more of the air than is necessary to maintain the temperature of the air within the upper end of the leer at a proper cooling temperature.

The temperature of the leer is maintained substantially constant within any horizontal cross-sectional area of the leer, while the temperature from the lower end of the leer progressively decreases but slowly to the point at which the hot air inlet shells 72 and 74 are located, where the glass has been brought below its critical temperature, it then decreases from the shells to the upper end of the leer at a more rapid rate. This produces a more rapid cooling of the glass so that when the glass is discharged from the upper end of the leer, the glass may be cut into sheets of desired size.

I claim:

1. In a leer for a molten glass producing furnace having a forebay for receiving molten glass and means defining and substantially enclosing a space above the molten glass in the forebay and means in the leer for drawing an elongated continuity of glass, formed in said space, through a formed glass inlet of the leer into the leer; the provision therewith of a communicating means, independent of the passageway through the leer, for connecting said space with the interior of the leer at a point spaced from the formed glass inlet of said leer; and means for producing gas pressure differentials in said communicating means and that part of the leer passageway extending between the formed glass inlet and the point of connection of the communicating means therewith whereby gas from said forebay space may be introduced into the leer at said point and directed through the leer toward the formed glass inlet of the leer.

2. In a leer for a glass producing furnace having a forebay for receiving molten glass and a chamber substantially enclosing the forebay, the leer having a passageway therethrough with an inlet at one end and means for moving formed glass in one direction through the leer inlet and passageway; the combination therewith of conduit means, independent of the leer passageway, having a passageway, one end of which is connected to said chamber and the other to said leer passageway at a point spaced from said leer inlet, and forming, with that portion of the leer passageway between the leer inlet and said point of connection of said conduit means, the leer inlet and said chamber, a pneumatic circuit; and a pneumatic pressure producing means connected to said pneumatic circuit for producing a zone of low pressure in a part of the circuit whereby gaseous elements ambient to the forebay are withdrawn from said chamber and directed into the leer passageway by said conduit means to flow in heat exchange relation with the formed glass therein toward said leer inlet and in a direction opposite to that of the movement of the formed glass through the leer.

3. The combination described in claim 2 having in addition thereto means including an adjustable wall extending across the forebay enclosing chamber to divide the chamber into two intercommunicating compartments, in one of which is located the forebay molten glass pool and the other of which directly communicates with the conduit means and leer inlet; and means for adjusting said wall to vary the degree of intercommunication between said compartments.

4. The combination described in claim 2 having in addition thereto means for dividing the forebay chamber into two communicating compartments, in one of which the forebay molten glass pool is located and the other of which is directly connected to the conduit means and leer inlet, said chamber dividing means comprising a pair of tiltably supported refractory blocks disposed in opposed and spaced edge to edge relation and extending laterally from opposite sides of the perimeter of the forebay into the space in said forebay enclosing chamber in proximity to and overhanging the molten glass in said forebay and a pair of tiltably supported reflector plates disposed in opposed and spaced relation, each extending toward the other across the space between the proximating edges of the refractory blocks and having a lateral surface in slidable lapping surface contact with a lateral surface of a refractory block to form an adjustable joint between said refractory block and plate substantially resistant to the passage of gases therethrough, one of the mutually proximating edges of the plates being spaced from the other to form a slot through which communication to both sides of the plates and refractory blocks may be had.

5. A method of circulating a glass annealing atmosphere within the formed glass passageway of a leer through which formed glass is moved from a leer inlet to a leer outlet which includes introducing preheated gases into the leer at a point spaced along the passageway and path of movement of the formed glass therethrough and between the inlet and outlet of the leer, producing a predetermined pneumatic pressure in the passageway between the leer inlet and point of introduction of preheated gases of a lower degree than that prevailing in that part of the passageway between the outlet and point of introduction of preheated gases whereby pneumatic flow of portions of said introduced gases in said leer passageway occurs in a direction toward said inlet and counter to that in which the formed glass moves through the passageway.

6. The method of producing a glass annealing atmosphere within a leer including the steps of introducing gaseous elements prevalent about the molten glass in a forebay of a glass producing furnace without substantial temperature loss into the leer at a point interjacent the formed glass inlet and outlet of the leer and moving said introduced gaseous elements in a direction toward and through said formed glass inlet.

7. The method of producing a glass annealing atmosphere within the formed glass passageway of a leer which includes introducing gaseous elements including those ambient to a forebay of a glass producing furnace, into the leer passageway at a point spaced from the formed glass inlet of the leer; withdrawing atmosphere from that part of the leer passageway which extends between said formed glass inlet and the point at which the gaseous elements are introduced into the leer passageway by producing a low pressure zone in the leer passageway proximate to said formed glass inlet whereby a portion of said introduced gaseous elements directed into said leer passageway will flow from said point toward said formed glass inlet of the leer.

8. The method of the preceding claim 7 in which the step of withdrawing atmosphere from that part of the leer passageway between the formed glass inlet and the point at which said gaseous elements are introduced into the leer passageway is taken coincidentally with the step of introducing said gaseous elements into the leer passageway.

9. The method of the preceding claim 7 together with the additional step of withdrawing the portions of said introduced gaseous elements from the leer passageway and discharging said withdrawn portions of gaseous elements into a forebay of a glass producing furnace whereby said portions of said gaseous elements may be reheated and mixed with other portions of gaseous elements ambient to said forebay for subsequent reintroduction to the leer passageway.

10. The method of producing a glass annealing atmosphere within the formed glass passageway of a tower leer which includes introducing heated gaseous elements into the vertically extending leer passageway at a point spaced above the formed glass inlet thereof; producing a predetermined pneumatic pressure in that part of the leer passageway between said formed glass inlet and said point of gaseous elements introduction of a lower degree than the pneumatic pressure prevailing in the part of the leer passageway between the formed glass outlet thereof and said point of gaseous elements introduction whereby pneumatic flow of portions of said introduced gaseous elements occurs in a downward direction through the leer passageway.

GEORGE W. BATCHELL.

REFERENCES CITED

The following references are of record in the file of this patent:

UNITED STATES PATENTS

| Number | Name | Date |
| --- | --- | --- |
| 1,032,239 | Player | July 9, 1912 |
| 1,595,912 | Monro | Aug. 10, 1926 |
| 2,002,544 | Monro | May 28, 1935 |
| 2,006,167 | Hohmann | June 25, 1935 |
| 2,120,452 | Amsler | June 14, 1938 |
| 2,297,737 | Batchell | Oct. 6, 1942 |

FOREIGN PATENTS

| Number | Country | Date |
| --- | --- | --- |
| 102,275 | Australia | Oct. 15, 1937 |